Figure 1:
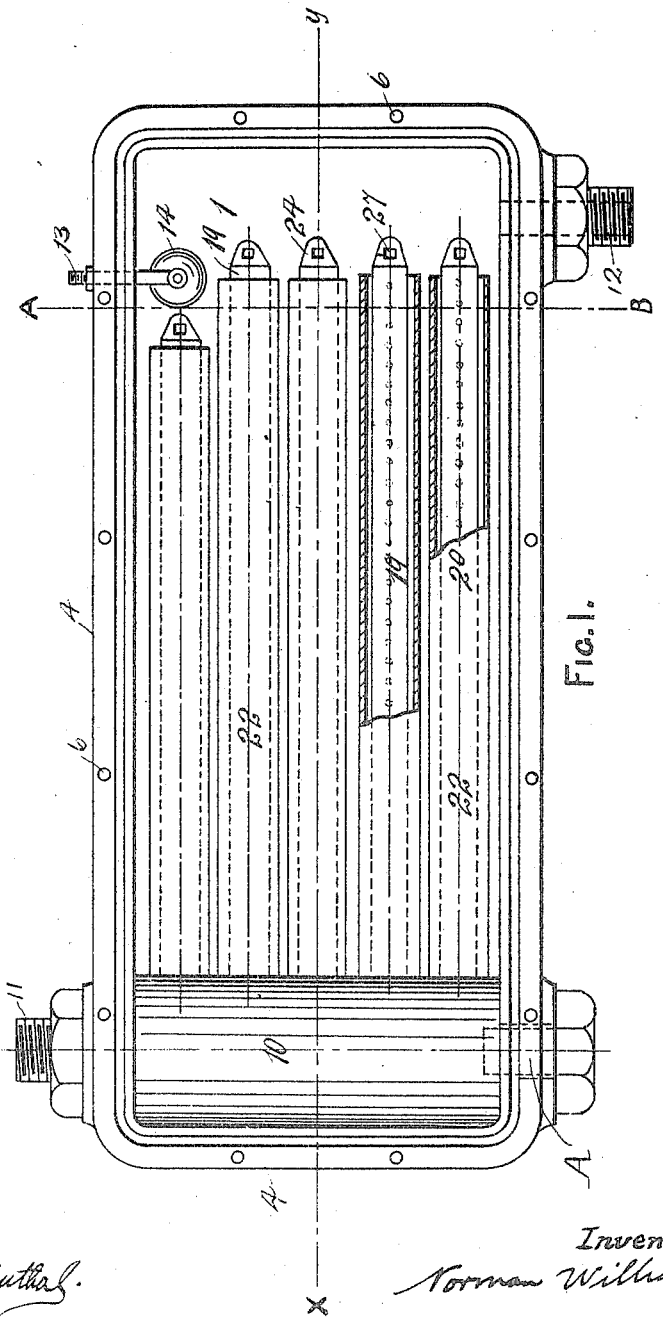

N. W. PILL.
CARBURETING APPARATUS.
APPLICATION FILED AUG. 10, 1909.

950,825.

Patented Mar. 1, 1910.
2 SHEETS—SHEET 1.

Witnesses.
Inventor
Norman William Pill
by B. Singer
Attorney.

N. W. PILL.
CARBURETING APPARATUS.
APPLICATION FILED AUG. 10, 1909.
950,825.
Patented Mar. 1, 1910.
2 SHEETS—SHEET 2.
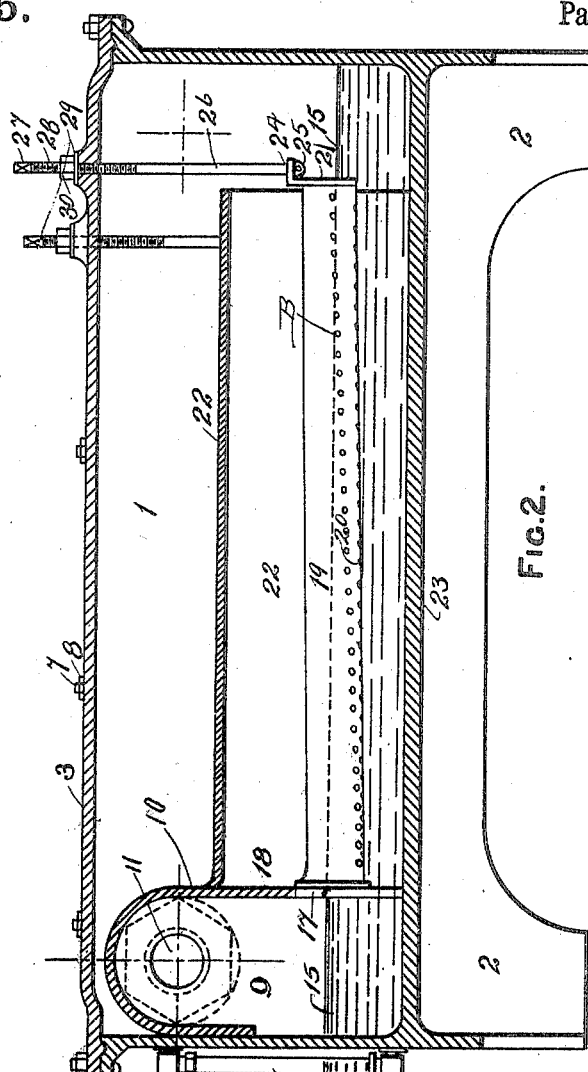
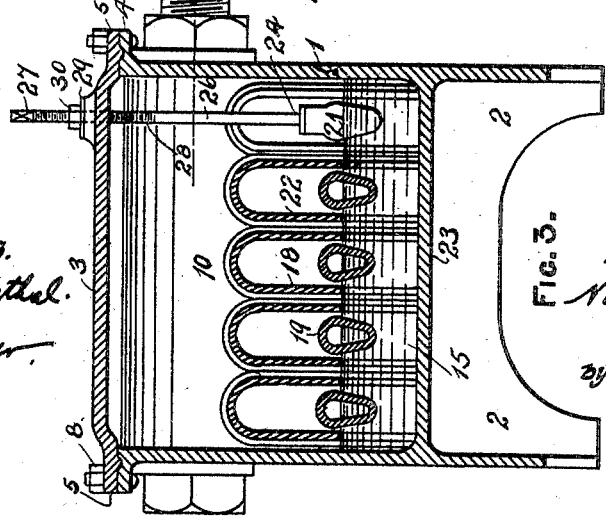
Witnesses.
Inventor,
Norman William Pill
by
B. Singer.
Attorney.

UNITED STATES PATENT OFFICE.

NORMAN WILLIAM PILL, OF NEWPORT, ENGLAND.

CARBURETING APPARATUS.

950,825. Specification of Letters Patent. Patented Mar. 1, 1910.

Application filed August 10, 1909. Serial No. 512,220.

*To all whom it may concern:*

Be it known that I, NORMAN WILLIAM PILL, subject of His Majesty the King of Great Britain, residing at Newport, in the county of Monmouth, Wales, Great Britain, have invented a new and useful Improvement in Carbureting Apparatus, of which the following is a specification.

This invention relates to improvements in and relating to apparatus for producing inflammable gas by carbureting air and has reference to that type of apparatus wherein inflammable gas is produced by passing air at a suitable pressure through light liquid hydrocarbons such for instance as spirit of petroleum. A difficulty which is invariably experienced in carbureting apparatus of this type is the obtaining of a gas containing the proper proportions of air and gaseous vapor.

In order to provide a means of regulating the proportions of air and vapor two primary methods have been adopted. In the one case an additional supply of air is provided and added to the gaseous mixture, usually after such mixture has passed out of the carbureting tank or chamber. In the other case the regulation of the mixture takes place in the carbureting tank or chamber itself and is in some cases effected by regulating the distance through the liquid which the air traverses. In my apparatus I propose to make use of the latter of these broad principles and an important feature of my invention consists in the provision of a series of perforated separately or collectively inclinable carbureter tubes by means of which I am enabled to obtain a more effective and finite regulation than has hitherto been possible. Moreover my invention comprises a particular construction, combination and arrangement of parts calculated to give a complete working plant which shall be simple and inexpensive of construction and efficient in use, and wherein the air and vapor of which the inflammable gas consists, are more intimately mixed than hitherto. And in order that my invention may be more readily understood and carried into practice, reference is hereby made to the accompanying sheets of illustrative drawings wherein:

Figure I represents a plan view of an apparatus constructed in accordance with my invention with the cover of the trough removed, parts being cut away to more clearly show the carbureter tubes within. Fig. II is a sectional elevation through line X, Y, Fig. I. Fig. III is a sectional end elevation, on line A, B, Fig. I.

Referring to these drawings wherein like numerals of reference indicate corresponding parts wherever occurring throughout all the figures, the numeral 1 designates a deep trough elevated on suitable feet, 2, and rendered airtight by means of its cover, 3, which is coupled thereto by the engaging flanges 4, 5, furnished with holes, 6, to receive bolts, 7, traversing both flanges which bolts are tightened together by nuts, 8, suitable packing being interposed between the flanges.

A common distribution chamber 9, is formed at one end of the trough by the diaphragm, 10, the only communications with which chamber are, on the one side, the inlet port for air from the compressor or blower through the junction, 11, and the near apertures, 17, of the carbureter tubes, 19. An outlet, fitted with a junction, 12, is made at the other end of the trough, preferably diagonally opposite to the inlet port.

Liquid hydrocarbon is admitted into the trough through the tube, 13, gravitating thereto from a storage tank, the requisite level of the said liquid being maintained by a float-feed regulator, 14, or the equivalent therefor. The level of the liquid hydrocarbon in the tank can be read off on a vertical glass gage, 16, fitted outside the trough, a convenient level being such that the liquid, 15, rises substantially to the centers of the apertures, 17, of the carbureter tubes.

I prefer to make the carbureter tubes, 19, of substantially pear-shaped section, Fig. III, and, if their near ends are fixed directly to the front portion, 18, of the diaphragm, 10, the material of which the latter is constructed is sufficiently flexible to admit of the inclination of the carbureter tubes being varied within limits. Larger apertures might however be made in the diaphragm, 10, corresponding to the sections of the conduits, 22, and these apertures covered by more flexible material to which the near ends of the carbureter tubes would be fixed. The said carbureter tubes, 19, are furnished with longitudinal series of small holes, 20, through which the pressure forces the air into the liquid, 15. While one line only of these orifices is represented at the bottom of each tube, and this a straight series, a series or line of orifices might be provided ascending spirally in the wall of the tube, 19, as shown in Fig. II. Moreover lines of perforations on both sides of the tube might be furnished instead of a single line. The remote ends of the tubes, 19, are closed by caps, 21, the upper parts, 24, of which may be turned over or deflected to the horizontal, and provided with holes or slots, vertical rods, 26, being swiveled to the parts 24.

The saturated or carbureted air, escaping from the surface of the liquid, does not rise directly into the trough, but is directed to the remote end thereof by means of hoods or conduits, 22, which hoods or conduits are of inverted "U" shape and rise from the bottom, 23, of the trough and are open only at the remote ends. By this arrangement, the total travel of the air, from the inlet port to the outlet port, through either carbureter tube, is constant and the carbureted air from each of the tubes 19, meets and mixes before passing out of the junction 12.

The inclination of the carbureter tubes, and, therefore the depths of the orifices therein, and the resistance offered by the liquid to the escape of air through them, may be regulated by various forms of mechanism. One method is represented in the accompanying drawings: Vertical rods, 26, are swiveled as aforesaid at 25, to the horizontal parts 24, of the caps 21. These rods are screw-threaded at their upper ends 28 and engage in tapped holes in the cover 3. The upper extremities 27, of the rods 26, may be squared to take keys or alternatively may be provided with terminals convenient for turning the rods. To make the bore gas-tight, nuts 30, may be employed to compress soft washers, 29. The lower ends of the rods 26 might however be hinged to the caps 21 and pass through smooth bores in the cover. In this case the rods would be raised and lowered by turning nuts, engaging with the screw threads 28 on the upper ends of such rods, which nuts would bear against the cover 3 externally. Cylindrical caps are in this case used on the extreme ends of the rods to screw down firmly on soft washers resting on the upper faces of said nuts.

While I prefer to regulate each tube independently, it will be readily understood that the tubes might be connected by a transverse rod and regulated by a single vertical rod.

According to my invention, and, by such apparatus as is herein described, the constituents of the gaseous product of the carbureter which is drawn off through the outlet port may be varied to any proportions and accurately regulated with relation to any required consumption within the limits of the minimum and maximum working capacity of the carbureter while a series of such carbureters may be connected up together to increase the total capacity. The air forced into the carbureter tubes tends to escape through the orifices which offer the least resistance to its passage, and these orifices may be submerged, by the regulating apparatus, to any required depth, within limits, or the end orifices may be raised free from the liquid to increase the proportion of air in the product.

It will be understood from the foregoing that by reason of the fact that each of the carbureter tubes is independently capable of being raised or lowered the apparatus provides for a very finite regulation. A difference in the richness of the mixture is effected even if the inclination of only one of the tubes 19 is altered assuming the air supply to be constant. More pronounced difference will result as each of the other tubes is altered so that by careful adjustment any desired mixture can be readily obtained. The provision of the hoods or conduits 22 also gives great practical advantages because by this means a better mixing of the gaseous vapor is effected. The air carbureted by its passage through each of the tubes 19 may vary as aforesaid in respect of each tube i. e. each tube may produce a gaseous vapor of different constitution but as the streams of gas all meet at the open ends of the conduits a satisfactory mixing takes place with the result that a proper mixture passes out of the junction pipe 12.

What I claim and desire to secure by Letters Patent is:—

1. In apparatus for carbureting air the combination of a liquid containing tank provided with a gage, a float feed and inlet and outlet orifices, a common air chamber within the tank, a plurality of partially immersed carbureting tubes, perforated at regular intervals on their under or immersed parts, said carbureting tubes being closed at one of their ends and flexibly connected to the wall of the air chamber at their other ends, means for varying the inclinations of the carbureting tubes within the limits of their flexible connections, and hoods or conduits containing the carbureting tubes, said hoods or conduits being open at their free ends, all arranged and operating substantially as specified.

2. In apparatus for carbureting air the combination of a liquid containing tank provided with a gage, a float feed and inlet and outlet orifices, a common air chamber within the tank, a plurality of partially immersed carbureting tubes, communicating with a common air chamber, perforated at regular intervals on their under or immersed parts, said carbureting tubes being closed at one of their ends and flexibly connected to the wall of the air chamber at their other ends, means for varying the inclinations of the carbureting tubes, said means comprising vertical rods with their lower ends swiveled to the deflected ends of the closing caps of said tubes, the upper portions of said rods being screw-threaded and engaging in tapped openings in the cover of the trough traversed by said rods, and nuts and soft washers threaded on the ends of said rods externally, substantially as described and for the purposes specified.

3. In apparatus for carbureting air the combination of a liquid containing tank provided with a gage, a float feed and inlet and outlet orifices, a common air chamber within the tank, a plurality of partially immersed carbureting tubes, communicating with a common air chamber, perforated at regular intervals on their under or immersed parts, said carbureting tubes being closed at one of their ends and flexibly connected to the wall of the air chamber at their other ends, means for varying the inclinations of the carbureting tubes, said means comprising vertical rods with their lower ends swiveled to the deflected ends of the closing caps of said tubes, the upper portions of said rods being screw-threaded and engaging in tapped openings in the cover of the trough traversed by said rods, and nuts and soft washers threaded on the ends of said rods externally, and hoods or conduits containing the carbureting tubes, said hoods or conduits being open at their free ends, all arranged and operated substantially as specified.

4. In apparatus for carbureting air, the combination of a common air chamber, a plurality of carbureting tubes receiving air from said air chamber formed at one end of the liquid containing trough or vessel, and a tank for maintaining the supply of liquid hydrocarbon, substantially as described and for the purposes specified.

In testimony whereof I have affixed my signature in presence of two witnesses.

NORMAN WILLIAM PILL.

Witnesses:
   ROBERT SPENCE,
   A. B. PEMPLE.